United States Patent [19]
Takezawa et al.

[11] Patent Number: 5,552,970
[45] Date of Patent: Sep. 3, 1996

[54] VEHICULAR LAMP AND MACHINE AND METHOD FOR MOLDING SAME

[75] Inventors: Shirou Takezawa; Souhei Sano, both of Shizuoka, Japan

[73] Assignee: Koito Manufacturing Co. Ltd., Tokyo, Japan

[21] Appl. No.: 421,265

[22] Filed: Apr. 13, 1995

[30] Foreign Application Priority Data

Apr. 20, 1994 [JP] Japan .................................. 6-104293

[51] Int. Cl.⁶ .................................................... B60Q 1/00
[52] U.S. Cl. .............................. 362/61; 362/267; 362/311
[58] Field of Search ............................. 362/61, 311, 267, 362/310

[56] References Cited

U.S. PATENT DOCUMENTS

| | | | |
|---|---|---|---|
| 5,113,331 | 5/1992 | Nagengast | 362/61 |
| 5,172,972 | 12/1992 | Terao | 362/61 |
| 5,258,686 | 11/1993 | Segoshi et al. | 362/61 |
| 5,285,362 | 2/1994 | Sakata | 362/61 |
| 5,287,101 | 2/1994 | Serizawa | 340/815.76 |

Primary Examiner—Denise L. Gromada
Assistant Examiner—Alfred Basichas
Attorney, Agent, or Firm—Sughrue, Mion, Zinn, Macpeak & Seas

[57] ABSTRACT

A vehicular lamp including a lamp body having a front opening, a shelf member integrally formed on an outer surface of a peripheral part of the front opening and extending entirely along the peripheral part thereof, a seal groove defined between the shelf member and the peripheral part of the front opening, and a volume reducing groove formed in the vicinity of a junction of the peripheral part of the front opening and the shelf member, and an outer lens coupled to the lamp body. The outer lens has a seal leg inserted in the seal groove of the lamp body and secured thereto by a sealing material. The thickness of the junction, i.e., the volume of resin at the junction, is reduced by the volume reducing groove to thereby avoid generating undesirable shrinkage during the resin molding process. Accordingly, the external appearance of the lamp body is not degraded, even in the inside portion of the lamp body which can be viewed from the outside, because there is no concave portion on an inner surface of the lamp body.

12 Claims, 6 Drawing Sheets

VEHICULAR LAMP AND MACHINE AND METHOD FOR MOLDING SAME

BACKGROUND OF THE INVENTION

The present invention is directed to a vehicular lamp, and more particularly to a vehicular lamp having a seal groove extending along the entire periphery of a front opening of the lamp body for mounting a front lens to the front opening. The invention also relates to a machine and method for manufacturing the same.

A conventional vehicular lamp is constituted by a lamp body in which is mounted a reflector, a light bulb and the like, an outer lens covering the front opening of the lamp body, and a seal groove formed in an outer peripheral part of the front opening of the lamp body extending along the peripheral part. With this structure, during assembly, a seal leg formed on the peripheral portion of the outer lens is inserted into the seal groove, and then the seal groove is filled with a sealing material such as a hot melt or the like. The outer lens is then fixedly coupled to the lamp body by hardening the sealing material.

FIG. 7 is a partially exploded perspective view of a conventional lamp of this type. As shown in FIG. 7, a shelf member 14, which is L-shaped in cross section, is integrally formed with a lamp body 1 on an outer peripheral part 11a of the front opening 11 thereof. A concave seal groove 15 is formed between the outer peripheral part 11a of the lamp body 1 and the shelf member 14. During the assembly of the lamp, a seal leg 52 of the outer lens 5 is inserted into the seal groove 15 to couple the lens 5 with the lamp body 1, and the outer lens 5 is secured thereto by filling and hardening a sealing material (not shown) filling the seal groove 15.

The inner surface of the lamp body is made reflective to form a reflector by coating thereon a thin layer of aluminum, depositing aluminum or the like. A bulb 3, supported inside the lamp body 1 by a bulb socket 2, emits light which is reflected by the reflector to thus provide a desired light distribution pattern.

The lamp body 1 thus constituted is generally formed integrally by a molding process. When the lamp body is actually molded, the junction 14a of the peripheral part 11a of the front opening 11 and the shelf member 14 for defining the seal groove 15 is thickened, that is, the volume of resin at the junction 14a becomes large. Therefore, the surface X of the junction portion cools earlier than other portions, and when the inside is cooled, the surface X of the junction portion undesirably sinks because the volume at the portion is shrunk.

FIG. 8 is an enlarged cross-sectional view of the conventional lamp taken along line XIII—XIII in FIG. 7 illustrating the condition where shrinkage at the surface X is generated on an inner surface of the lamp body 1 in areas corresponding to the seal groove. The shrinkage X extends along the entire periphery of the front opening 11, thereby degrading the external appearance of the lamp since the linear shrinkage region can be viewed from the outside through the outer lens.

Particularly, in the case where the inner surface of the lamp body 1 forms the reflector, since a small concave/convex condition on the reflector can cause a relatively large alteration in the reflected light pattern, the shrinkage X becomes particularly conspicuous and the external appearance of the lamp is accordingly seriously deteriorated.

Further, for a lamp having a substantially transparent clear lens in which no lens steps are formed, as has recently become common, the shrinkage X is quite conspicuous when viewed through the lens 5.

Furthermore, if shrinkage X, that is, a concave/convex condition, is formed on the inner bottom surface of the seal groove 15, the flow of the sealing material tends to stagnate in such regions when the seal groove is filled with sealing material. As a result, air bubbles may be generated, thereby decreasing the mounting strength of the outer lens by the sealing material and also decreasing the sealability at the mounting portion.

SUMMARY OF THE INVENTION

The present invention was made in view of the foregoing problems accompanying the conventional vehicular lamp.

Accordingly, it is an object of the present invention to provide a vehicular lamp which is capable of preventing shrinkage by a concave/convex condition on a seal groove formed on a lamp body.

Another object of the present invention is to provide a vehicular lamp improved in external appearance by avoiding shrinkage on the lamp body and also improved in mounting strength and sealability of an outer lens by a sealing material.

Still another object of the present invention is to provide a machine for manufacturing vehicular lamps with which there is no problem of shrinkage along the entire seal groove of the lamp body.

It is a further object of the present invention to provide a method for producing a vehicular lamp in which there is no shrinkage along the entire seal groove of the lamp body.

The above and other objects can be achieved by the provision of a vehicular lamp which, according to the present invention, includes a lamp body having a front opening which is provided with a seal groove, a shelf member integrally formed on an outer peripheral portion of the front opening and extending along the front opening, a seal groove defined between the shelf member and the peripheral portion, and a volume reducing groove formed at a junction of the peripheral part of the front opening and the shelf member.

Preferably, the volume reducing groove is formed on the surface which is the outer face of the shelf member and extends along the outer surface of the lamp body.

In a molding machine for manufacturing vehicular lamps according to the present invention, the resin molding apparatus for molding the lamp body having the seal groove is provided with a protrusion for forming the volume reducing groove which reduces the volume of the junction of the peripheral portion of the front opening and the shelf member of the lamp body.

A method for manufacturing vehicular lamps according to the present invention includes the steps of forming in a molding apparatus a protrusion for reducing the resin volume of a molded lamp body at a junction thereof which connects a shelf member to a peripheral part of a front opening, and injection molding the lamp body with resin using the molding apparatus. In the lamp body formed by the manufacturing method of the invention, the volume reducing groove is formed at the junction which connects the shelf member to the peripheral part of the front opening of the lamp body at the same time the lamp body is molded.

The thickness of the junction, i.e., the volume of resin at the junction, is reduced by the volume reducing groove to thereby avoid generating undesirable shrinkage during the resin molding process. Accordingly, the external appearance of the lamp body is not degraded, even in the inside portion of the lamp body which can be viewed from the outside, because there is no concave portion on an inner surface of the lamp body. Moreover, the lamp according to the present invention does not suffer from the problem of air bubbles being generated in the sealing material while filling the sealing material in the seal groove due to the concave portion formed on the inner bottom surface of the seal groove.

Further, the volume reducing groove, which prevents shrinkage of the lamp body and improves the external appearance and the lens mounting strength, can easily be formed merely by adding the protrusion for forming the volume reducing groove to a conventional mold apparatus. In other words, it is not necessary to design and produce a new resin molding apparatus for achieving the present invention, but merely to make minor modifications to the conventional apparatus.

Moreover, a lamp body which prevents undesirable shrinkage from occurring and which is improved in reliability can be readily manufactured without substantially modifying the conventional process.

DESCRIPTION OF THE PREFERRED EMBODIMENTS

Preferred embodiments of the present invention will be described with reference to the accompanying drawings.

Figure 1:
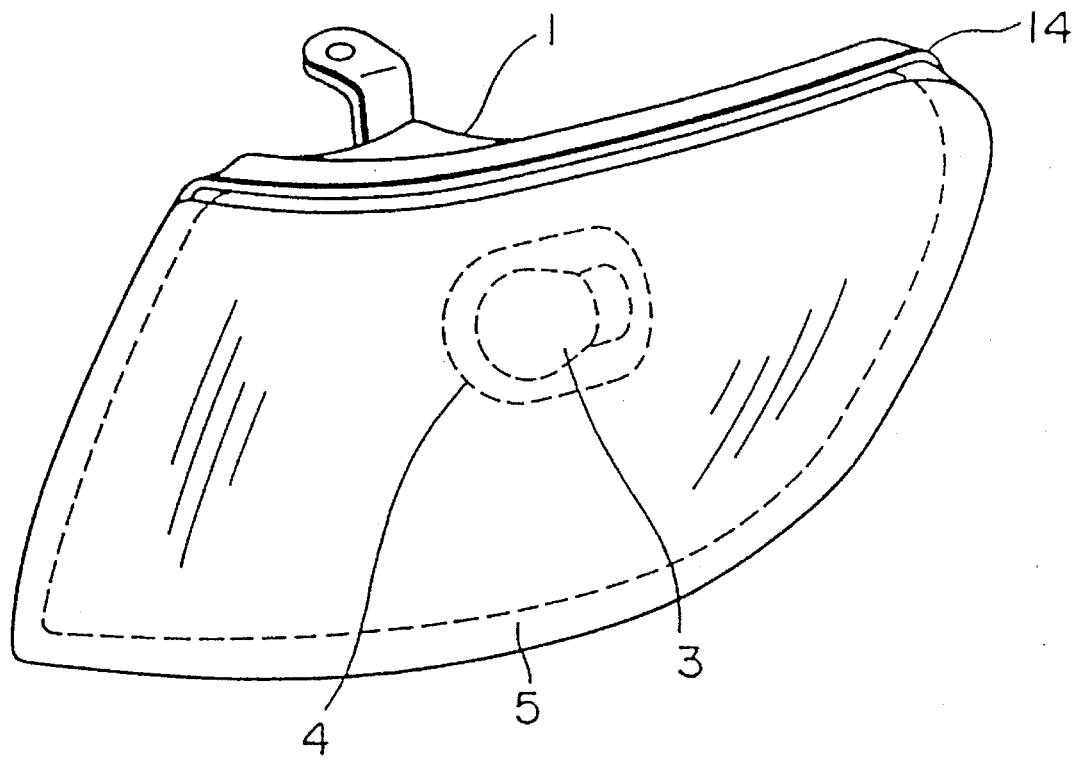
FIG. 1 is a perspective view showing a front turn signal lamp for an automobile to which an embodiment of the present invention is applied.
Figure 2:
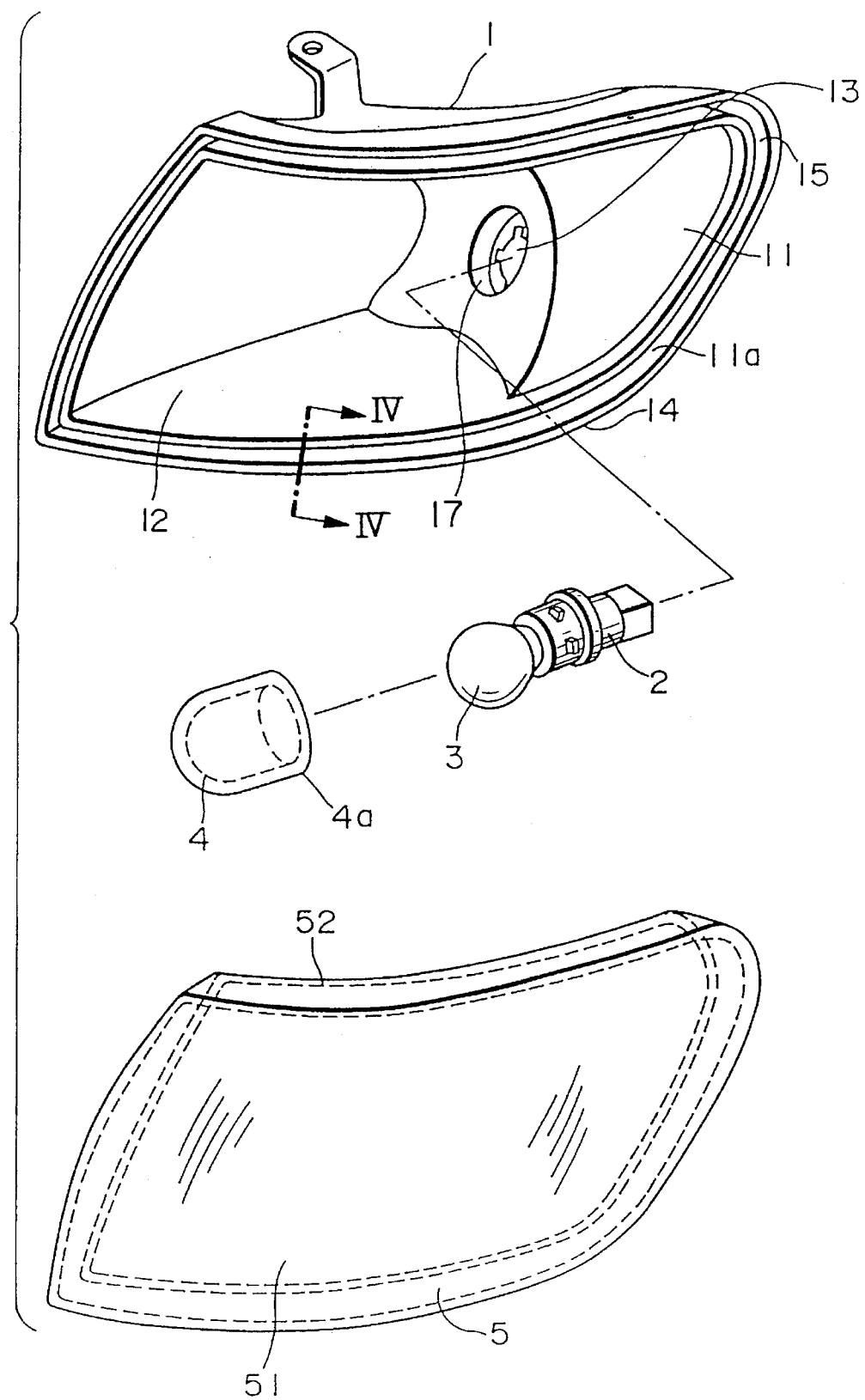
FIG. 2 is a partially exploded perspective view of the front turn signal lamp shown in FIG. 1.
Figure 3:
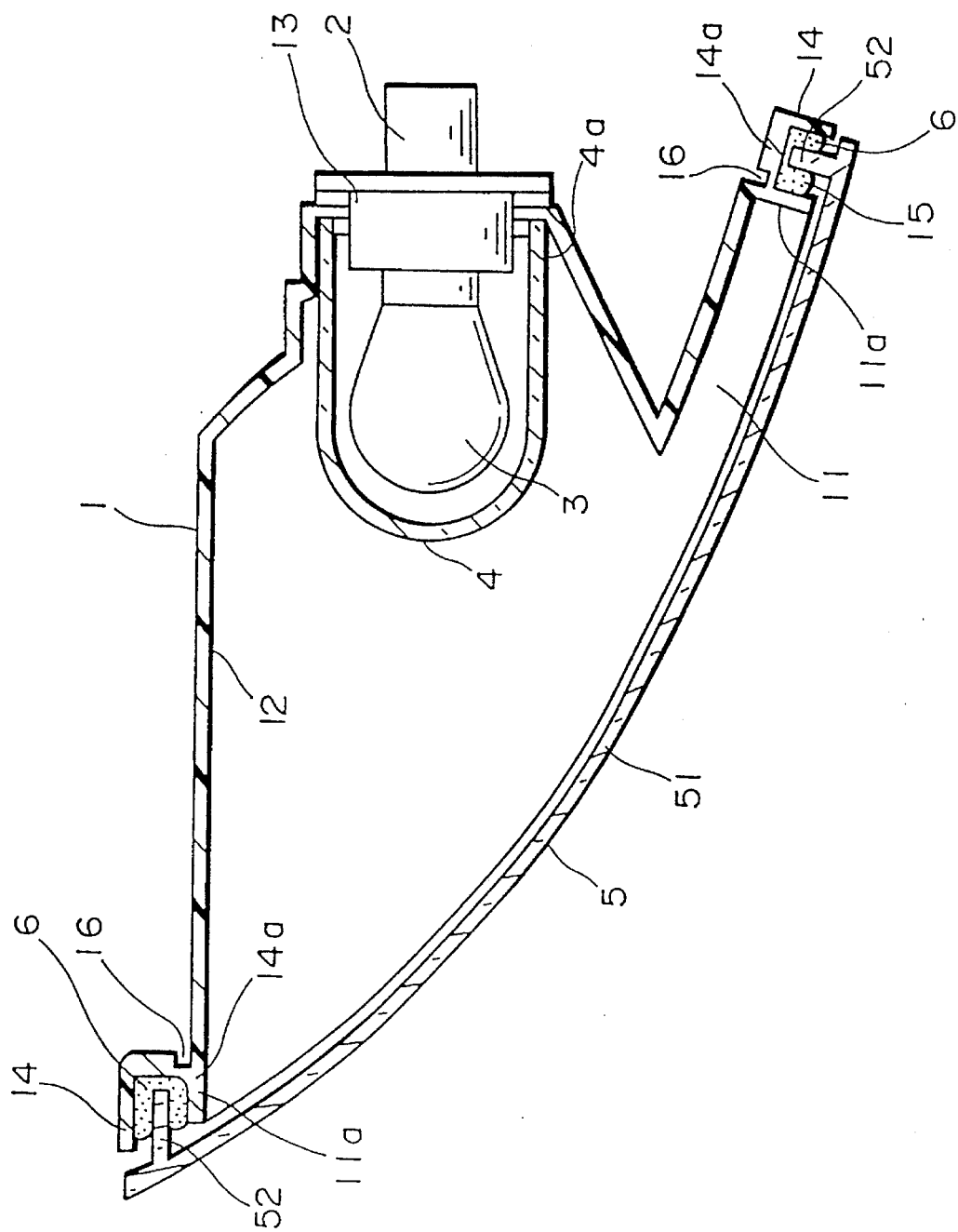
FIG. 3 is a side sectional view of the front turn signal lamp shown in FIG. 1.

FIG. 1 is a perspective view showing a front turn signal lamp for an automobile constructed in accordance with the present invention. FIG. 2 is a partially exploded perspective view of the front turn signal lamp shown in FIG. 1. FIG. 3 is a side sectional view of the front turn signal lamp shown in FIG. 1.

In these figure drawings, a lamp body 1 has a front opening 11 which is curved from the front to the left side thereof so that the lamp body 1 can be mounted in a designated space on an automobile (not shown in the drawings). The lamp body 1 is formed by injection molding black resin material. The inner surface of the lamp body 1 is made reflective by coating a thin layer of aluminum on the inner surface of the lamp body, thus forming a reflector 12.

The rear surface of the lamp body 1 is provided with a bulb insertion hole 13 having a small diameter in which a bulb socket 2 is mounted. Through the bulb socket 2 a bulb 3 is supported in the lamp chamber of the lamp body 1. The bulb socket 2 is inserted from the rear of the lamp body 1 into the bulb insertion hole 13 and engaged therewith by a bayonet mechanism. In this embodiment, a clear bulb is employed for the bulb 3, which is covered with a cap 4 of an amber color. A bottom part 4a of the cap 4 is fitted to a concave portion 17 formed on a periphery of the bulb insertion hole 13 of the lamp body 1 so that the cap 4 is secured to the lamp body. In another arrangement, the cap 4 may be secured to the lamp body 1 more strongly using an adhesive or the like.

Figure 4:
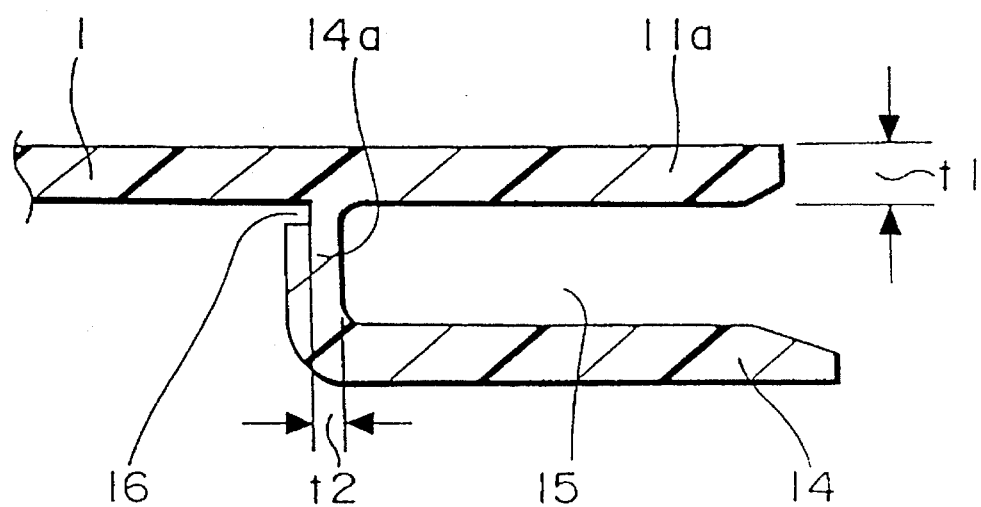
FIG. 4 which is a partially enlarged view of the front opening portion 11 of the lamp body taken along line IV—IV in FIG. 2.

As illustrated in FIG. 4, which is a partially enlarged view of the front opening portion 11 of the lamp body taken along line IV—IV in FIG. 2, the lamp body 1 is provided at an outer peripheral portion of the front opening 11 with a shelf member 14, a sectional view of which is substantially L shaped. The shelf member 14 is formed integrally with the lamp body 1 at an outer surface of a peripheral part 11a of the front opening 11, and it extends along the entire peripheral part 11a thereof. The shelf member 14 and the peripheral part 11a of the front opening 11 define a concave seal groove 15 extending along the periphery of the front opening 11. At a junction 14a of the peripheral part 11a of the front opening 11 and the shelf member 14 defining the seal groove 15 there is provided a volume reducing groove 16 extending along the outer surface of the entire peripheral part 11a of the front opening 11 from the rear surface of the lamp body 1. The volume reducing groove 16 acts to reduce the thickness of the junction 14a, thereby to reduce the volume of the resin at the portion in the vicinity thereto. In the present embodiment, the volume reducing groove 16 has a rectangular shape in cross section.

A front lens 5 having a surface conforming to the front left fender of the automobile is mounted on the front opening 11 of the lamp body 1. The lens front 5, which is formed by molding with a transparent resin, is provided with a curved lens part 51 on which lens steps are formed, and a seal leg part 52 disposed at the peripheral portion of the lens part 51 and projecting substantially perpendicularly with respect to the lens surface. During the assembly of the lamp, the seal leg part 52 is inserted into the seal groove 15, and the seal groove is filled with a sealing material 6 such as a hot melt or the like. Thus, the front lens 5 is secured to the lamp body 1 by hardening the sealing material.

Figure 5:
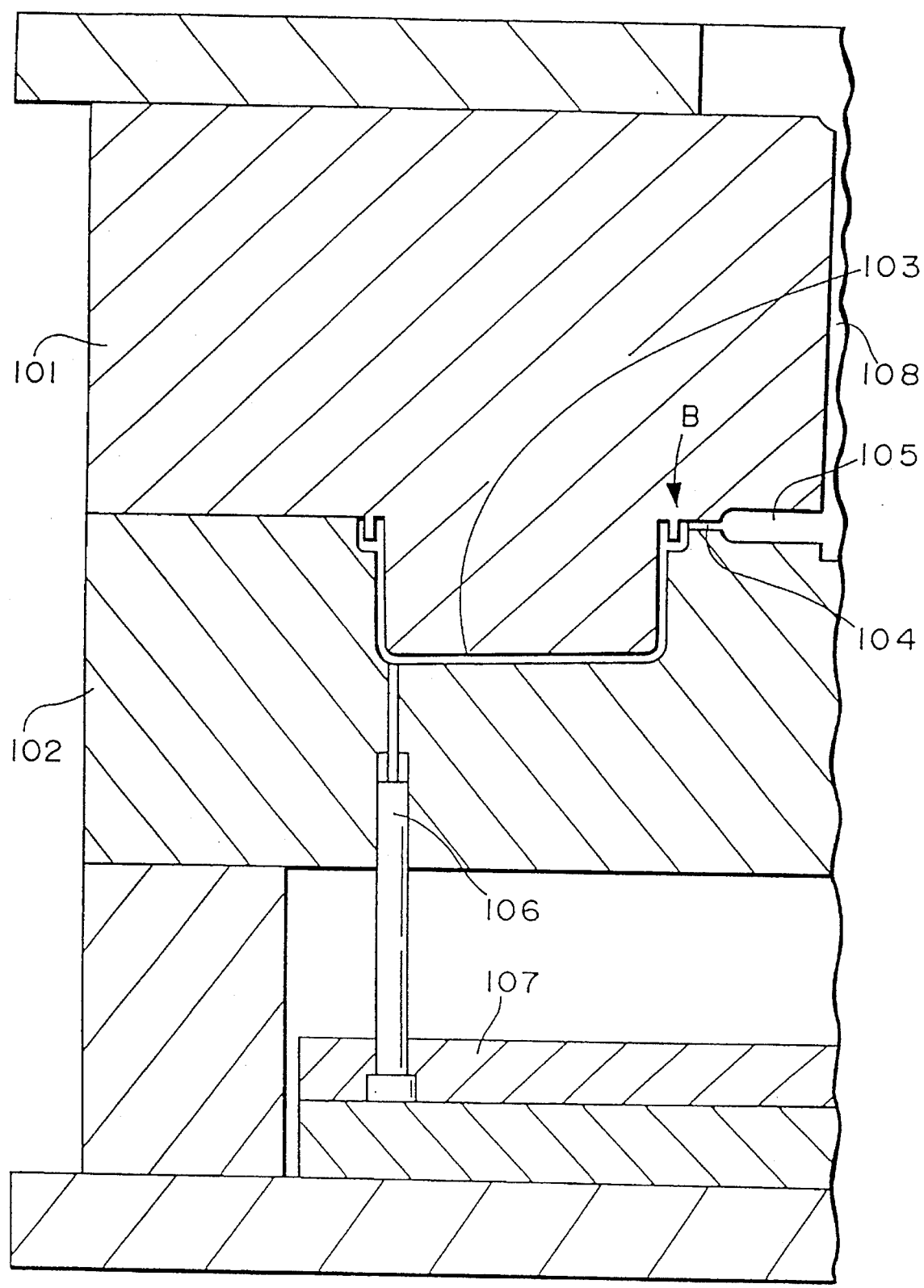
FIG. 5 is a cross-sectional view of a molding apparatus for injection molding of the lamp body.

FIG. 5 is a cross-sectional view of a molding apparatus for injection molding of the lamp body 1. The molding apparatus is provided with a stationary mold 101 and a movable mold 102 which define therebetween a cavity 103 for the lamp body 1. At a part of the stationary mold 101 which confronts the cavity 103, that is, at a side part on the rear of the lamp body 1, there is provided an opening for a gate 104 for injecting resin. The gate 104 communicates with a sprue 108 through a runner 105. The sprue 108 connects to an injection nozzle of the injection molding machine (not shown).

A pushing pin 106 is disposed in the movable mold 102 at a part thereof. The bottom portion of the pushing pin 106 is supported by a pushing plate 107. After molding the lamp body 1 in the cavity 103, the movable mold 102 is retracted from the stationary mold 101 and the pushing plate 107 moved towards the movable mold 102, so that the tip end of the pushing pin 106 pushes the molded lamp body 1 out of the movable mold 102.

Figure 6:
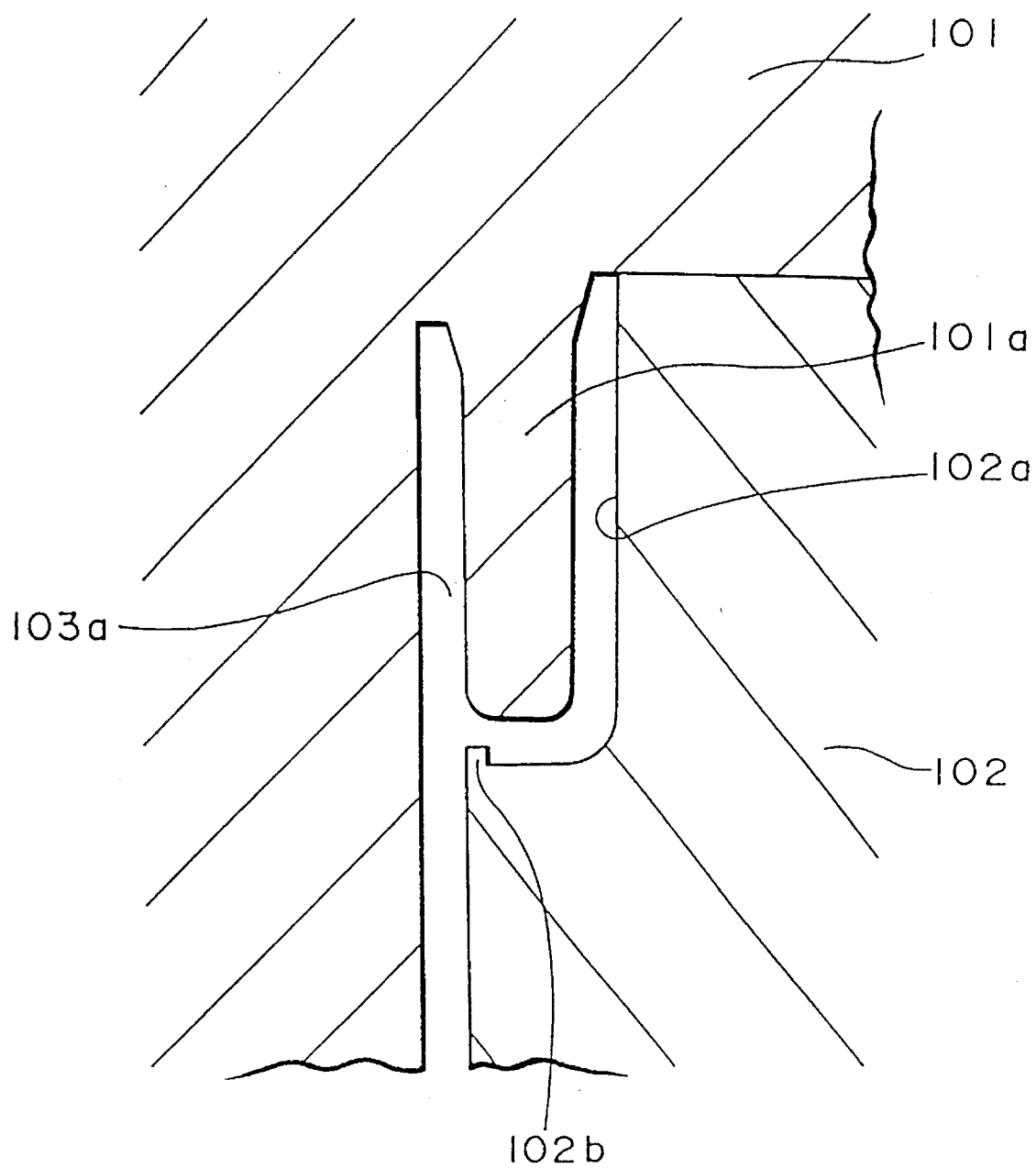
FIG. 6 is an enlarged view of a portion B of the molding apparatus shown in FIG. 5.
Figure 7:
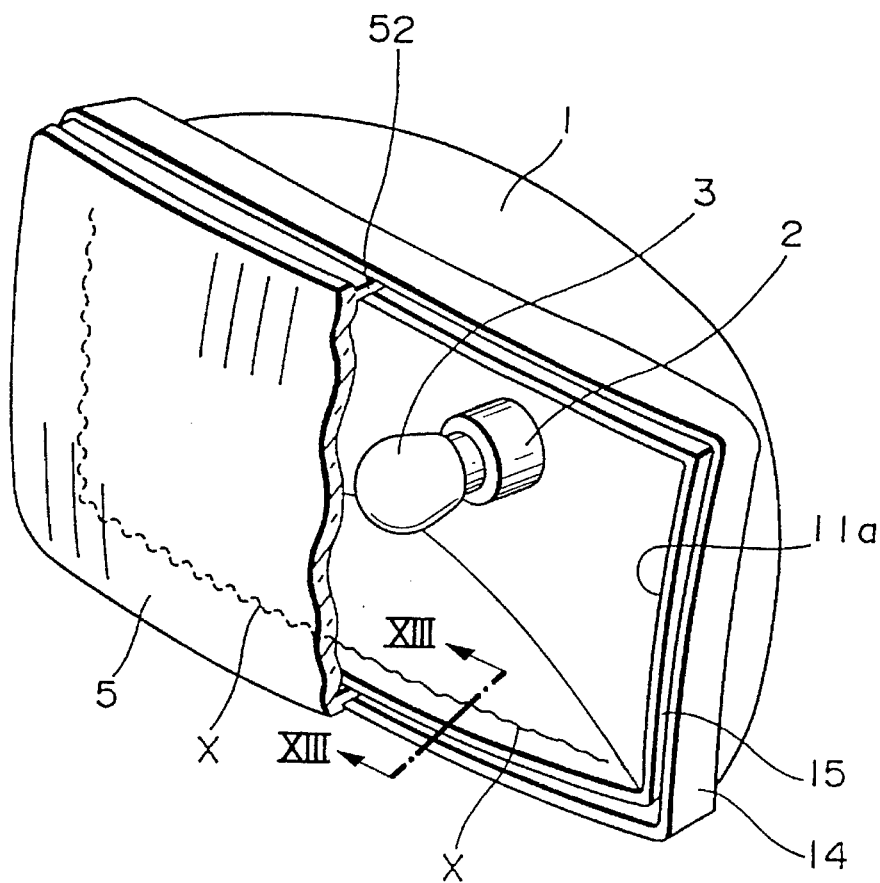
FIG. 7 is a partially exploded perspective view of a conventional lamp.
Figure 8:
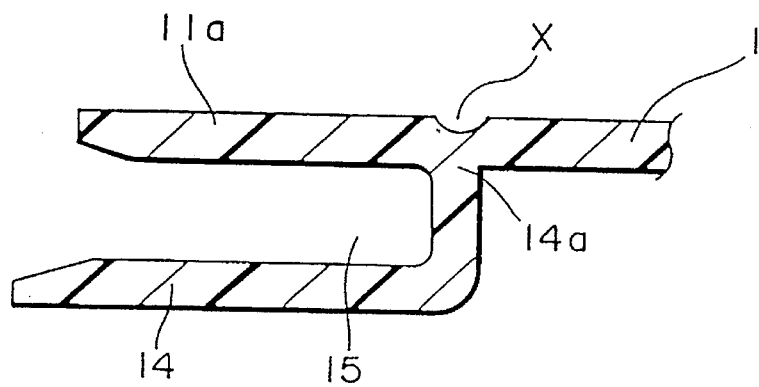
FIG. 8 is an enlarged cross-sectional view of the conventional lamp taken along line XIII—XIII in FIG. 7.

FIG. 6 is an enlarged view of a portion B of the molding apparatus shown in FIG. 5 showing how the seal groove 15 of the lamp body 1 is formed. As shown in FIG. 6, the movable mold 102 is provided with a concave part 102a for forming the rear surface of the shelf member 14, and at a part of the stationary mold 101 confronting the concave part 102a of the movable mold 102 there is disposed a projection part 101a for forming the seal groove 15. The concave part 102a of the movable mold 102 and the projection part 101a of the stationary mold 101 define a U-shaped cavity 103a. A protrusion 102b having a very low height is formed on a part of the movable mold 102 in such a manner that the protrusion 102b protrudes in the concave part 102a towards the stationary mold 101 and peripherally extends along the rear of the periphery of the front opening 11. The protrusion 102b of the movable mold 102 is rectangularly shaped in cross section and forms the volume reducing groove 16 of the lamp body 1.

When a lamp body is molded using the molding apparatus described above, a fused resin of a black color is injected from the sprue 108 through the runner 105 and the gate 104 into the cavity 103. The cavity 103 is then filled with the injected resin, which hardens after a certain time period. After hardening the resin, the movable mold 102 is retracted from the stationary mold 101, and thereafter the pushing plate 107 is moved towards the movable mold 102. Then, the molded lamp body, still adhered to the movable mold 102, is pushed out of the movable mold 102 by the tip end of the pushing pin 106.

During the molding process, the volume reducing groove 16 is formed at the junction 14a connecting the shelf member 14 to the peripheral part 11a of the front opening 11, so that the volume of the resin is reduced in the vicinity of the portion forming the seal groove 15 of the lamp body 1. Owing to this arrangement, when the surface part of the molded resin around this portion initially hardens and then the inside of this portion hardens at a slightly later time so that shrinkage unavoidably occurs to some extent, the shrinkage has little effect because the volume of resin is previously reduced by the volume reducing groove 16. In other words, the occurrence of shrinkage at the junction 14a is effectively suppressed, and undesirable shrinkage in the inner surface of the peripheral part 11a of the front opening 11 occurring along the entire seal groove 15 is prevented.

Accordingly, when the inner surface of the lamp body 1 is viewed from the outside through the front lens 5, no concave line due to shrinkage is seen, so that the external appearance of the lamp is not degraded in the case where the inner surface of the lamp body 1 forms a reflector 12, even in the case where no lens steps are formed on the transparent lens 5, i.e., a clear lens is employed.

Further, because the inner surface of the seal groove 15 has no undesirable shrinkage, no concave and convex condition occurs on the inner bottom face of the seal groove 15. Therefore, the lamp body 1 according to the present invention does not suffer from the problems of the fillability being deteriorated due to a concave and convex condition when the seal groove 15 is filled with the sealing material 6 and of air bubbles or the like being generated in the sealing material 6 to thereby decrease the adhesive force and sealability at the portions around the seal groove 15.

Furthermore, the cooling efficiency of the resin at the junction 14a connecting the shelf member 14 to the peripheral part 11a of the front opening 11 is improved by forming the volume reducing groove 16. With this arrangement, the cooling efficiency of the shelf member 14 itself is also improved. Owing to this improvement, even if the shelf member 14 is designed to be thick, the cooling speed of resin at the shelf member 14 will not be much slower than that of the other parts during the molding process. Thus, the tip end of the shelf member 14 does not suffer from deformation, which might otherwise occur if the cooling speed is slow.

It is preferable for the thickness of portions of the lamp body 1 where the seal groove 15 is formed to satisfy the following relationship:

$$0.6 < t_2/t_1 < 0.9$$

where $t_1$ represents the thickness of the peripheral part 11a of the lamp body 1 and $t_2$ is the thickness of the shelf member 14 at the portion where the volume reducing groove 16 is formed as shown in FIG. 4. If the ratio of the thicknesses exceeds 0.9, the cooling efficiency at the shelf member 14 is lowered, in which case undesirable shrinkage may not be avoided, while on the other hand if the ratio of the thicknesses is smaller than 0.6, although the problem of shrinkage is resolved, the mechanical strength of the shelf member 14 is lowered, which may decrease the mounting strength of the front lens 5 to the lamp body 1.

The volume reducing groove 16 may be formed on the inner bottom surface of the seal groove 15 in a case where the concave and convex condition caused by the volume reducing groove 16 does not significantly affect the fillability of the sealing material. In this case, the volume reducing groove 16 cannot be seen from the outside the lamp body, and also the volume reducing groove 16 itself is filled with the sealing material, to thereby suppress any decrease of the mechanical strength of the lamp body due to the formation of the volume reducing groove 16.

Although the foregoing embodiment is directed to an example in which the inner surface of the lamp body forms the reflector, the present invention is also applicable to lamps in which the reflector is provided separately from the lamp body. That is, if the inner peripheral part of the front opening of the lamp body not coated with a reflective layer is visible from the outside through the front lens coupled to the front opening, the external appearance of the lamp is not deteriorated by shrinkage.

The cross-sectional shape of the volume reducing groove 16 and the protrusion 102b of the movable mold 102 for forming the same may be tapered, arcuate or curved as desired. Particularly, a volume reducing groove curved in cross section can avoid undesirable stress concentration at corner edges which might cause cracking or chipping because the volume reducing groove has no corner edge.

As described above, according to the present invention, a lamp body is provided having a front opening around which is formed a seal groove, a shelf member integrally formed on the outer peripheral portion of the front opening and extending along the entire front opening, a seal groove defined between the shelf member and the peripheral portion, and a volume reducing groove formed at the junction of the peripheral part of the front opening and the shelf member. With this structure, the thickness of the junction, i.e., the volume of resin at the junction, is reduced by the volume reducing groove to thereby avoid generating undesirable shrinkage during the resin molding process. Accordingly, the external appearance of the lamp body is not degraded, even if the inside of the lamp body is viewed from the outside, because there is no concave portion on the inner surface of the lamp body. Moreover, the lamp according to the present invention does not suffer from the problem of air bubbles being generated in the sealing material while filling the sealing material in the seal groove due to the presence of a concave portion on the inner bottom surface of the seal groove, which can decrease the mounting strength and sealability between the outer lens and the lamp body.

Further, in a molding machine for manufacturing vehicular lamps according to the present invention, a resin molding apparatus for molding a lamp body having a seal groove is provided with a protrusion for forming a volume reducing groove which reduces the volume of the junction of the peripheral portion of the front opening and the shelf member of the lamp body. According to the invention, formation of the volume reducing groove, which prevents shrinkage of the lamp body and improves the external appearance and the lens mounting strength, can easily be accomplished by merely adding a protrusion for forming the volume reducing groove to a conventional mold apparatus. In other words, it is not necessary to produce a new resin molding apparatus for achieving the present invention, but merely to slightly modify a conventional apparatus.

Furthermore, a method for manufacturing vehicular lamps according to the present invention includes steps of forming in a molding apparatus a protrusion for reducing the resin volume of a molded lamp body at a junction thereof which connects a shelf member to a peripheral part of a front opening, and injection molding the lamp body with resin using the molding apparatus. The lamp body formed by the manufacturing method of the invention can form the volume reducing groove at the junction which connects the shelf member to the peripheral part of the front opening of the lamp body at the same time the lamp body is molded. Therefore, a lamp body which prevents undesirable shrinkage and is improved in reliability can be readily manufactured using a molding process which does not deviate substantially from the conventional process.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular lamp, comprising:

a lamp body having a front opening, a shelf member integrally formed on an outer surface of a peripheral part of said front opening and extending entirely along said peripheral part, a seal groove defined between said shelf member and said peripheral part of said front opening, and a volume reducing groove formed adjacent to a junction of said peripheral part of said front opening and said shelf member; and an outer lens coupled to said lamp body, said outer lens comprising a seal leg inserted in said seal groove of said lamp body and secured thereto by a sealing material, wherein a relationship in thickness of said lamp body satisfies an equation:

$$0.6 \leq t_2/t_1 \leq 0.9$$

where $t_1$ is a thickness of said peripheral part of said lamp body and $t_2$ is a thickness of said shelf member at a portion where said volume reducing groove is formed.

2. The vehicular lamp according to claim 1, wherein an inner surface of said lamp body has a reflective coating formed thereon.

3. The vehicular lamp according to claim 2, wherein said reflective coating comprises a thin layer of aluminum.

4. The vehicular lamp according to claim 2, wherein said reflective coating comprises an aluminum deposition.

5. The vehicular lamp according to claim 1, wherein said volume reducing groove is formed in an outer face of said shelf member and extends entirely along said peripheral part of said front opening.

6. The vehicular lamp according to claim 1, wherein said volume reducing groove has a rectangular shape in cross section.

7. The vehicular lamp according to claim 1, wherein said volume reducing groove has a tapered shape in cross section.

8. The vehicular lamp according to claim 1, wherein said volume reducing groove has an arcuate shape in cross section.

9. The vehicular lamp according to claim 1, wherein said volume reducing groove has a curved shape in cross section.

10. The vehicular lamp according to claim 1, wherein said volume reducing groove is formed on an inner bottom surface of said seal groove.

11. The vehicular lamp according to claim 1, further comprising a reflector provided separately from said lamp body.

12. The vehicular lamp according to claim 1, wherein said outer lens is a substantially transparent clear lens on which no lens steps are formed.

* * * * *